(12) United States Patent
Choi

(10) Patent No.: US 10,772,455 B2
(45) Date of Patent: Sep. 15, 2020

(54) COOKING APPLIANCE AND METHOD FOR CONTROLLING COOKING APPLIANCE

(71) Applicant: LG ELECTRONICS INC., Seoul (KR)

(72) Inventor: Sungho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/569,173

(22) PCT Filed: Apr. 29, 2016

(86) PCT No.: PCT/KR2016/004527
§ 371 (c)(1),
(2) Date: Oct. 25, 2017

(87) PCT Pub. No.: WO2016/182237
PCT Pub. Date: Nov. 17, 2016

(65) Prior Publication Data
US 2018/0146812 A1 May 31, 2018

(30) Foreign Application Priority Data

May 12, 2015 (KR) .................. 10-2015-0065906

(51) Int. Cl.
*A47J 27/10* (2006.01)
*A47J 27/04* (2006.01)
(Continued)

(52) U.S. Cl.
CPC ............... *A47J 27/10* (2013.01); *A23L 5/13* (2016.08); *A23L 5/17* (2016.08); *A47J 27/04* (2013.01);
(Continued)

(58) Field of Classification Search
CPC .. A47J 27/10; A47J 27/16; A47J 27/04; A23L 5/13; A23L 5/17; F24C 13/00;
(Continued)

(56) References Cited

U.S. PATENT DOCUMENTS 2,425,816 A * 8/1947 Maxson .................... A23L 3/28
62/231
3,435,990 A * 4/1969 Pike, Jr. ............... B67D 1/0001
222/1

(Continued)

FOREIGN PATENT DOCUMENTS

EP    2 000 741    12/2008
EP    2 389 807    11/2011
(Continued)

OTHER PUBLICATIONS

International Search Report and Written Opinion (with English Translations) dated Aug. 31, 2016 issued in Application No. PCT/KR2016/004527.

(Continued)

*Primary Examiner* — Steven N Leff
(74) *Attorney, Agent, or Firm* — Ked & Associates LLP

(57) ABSTRACT

The present invention relates to a cooking appliance comprising: a cabinet defining a cooking chamber; a heating means installed on the cabinet and formed so as to heat the inside of the cooking chamber; an air pump installed on an outer side extends into the cooking chamber; a cooking pack arranged selectively inside the cooking chamber and formed so as to accommodate an object to be cooked; and a control unit for controlling the heating means and the air pump, wherein one side of the cooking pack is detachable from a free end of the tube. According to the present invention, sous vide cooking is enabled by, within a single plate, vacuum treating the space where the object to be cooked is accom- (Continued)

modated and controlling the temperature inside the cooking chamber during cooking.

13 Claims, 8 Drawing Sheets

(51) Int. Cl.
  *A23L 5/10* (2016.01)
  *F24C 15/00* (2006.01)
  *F24C 15/32* (2006.01)
  *H05B 6/64* (2006.01)
  *H05B 6/80* (2006.01)
  *F24C 13/00* (2006.01)

(52) U.S. Cl.
  CPC .............. *F24C 13/00* (2013.01); *F24C 15/00* (2013.01); *F24C 15/327* (2013.01); *H05B 6/645* (2013.01); *H05B 6/6479* (2013.01); *H05B 6/80* (2013.01); *A23V 2002/00* (2013.01)

(58) Field of Classification Search
  CPC ...... F24C 15/32; F24C 15/322; F24C 15/327; A23V 2002/00
  See application file for complete search history.

(56) References Cited

U.S. PATENT DOCUMENTS

| | | | | |
|---|---|---|---|---|
| 4,796,788 A * | 1/1989 | Bond | ................. | B65D 77/067 222/105 |
| 5,097,759 A * | 3/1992 | Vilgrain | ................. | A47J 17/18 219/441 |
| 5,114,045 A * | 5/1992 | Herpe | ................. | A23G 3/28 222/105 |
| 5,673,817 A * | 10/1997 | Mullen | ................. | B65D 77/06 222/105 |
| 5,803,317 A * | 9/1998 | Wheeler | ................. | B67D 1/0004 222/105 |
| 6,056,157 A * | 5/2000 | Gehl | ................. | B65D 77/06 222/105 |
| 6,561,383 B1 * | 5/2003 | Reddy | ................. | B65D 75/5877 222/1 |
| 6,860,407 B2 * | 3/2005 | Gosselin | ................. | G01F 11/028 222/1 |
| 7,147,134 B2 * | 12/2006 | Gutierrez | ................. | B67D 1/0004 222/146.1 |
| 8,459,503 B2 * | 6/2013 | Groesbeck | ................. | B65D 5/4204 220/592.01 |
| 2009/0256100 A1 | 10/2009 | Lee | | |
| 2012/0137898 A1 * | 6/2012 | Alipour | ................. | A47J 27/04 99/483 |
| 2013/0240500 A1 * | 9/2013 | Alipour | ................. | A47J 27/004 219/438 |
| 2014/0260998 A1 * | 9/2014 | Pearson | ................. | A47J 27/002 99/288 |
| 2015/0040516 A1 * | 2/2015 | Torre | ................. | B65B 25/22 53/167 |
| 2015/0335192 A1 * | 11/2015 | Plazarte | ................. | B65B 25/22 99/332 |

FOREIGN PATENT DOCUMENTS

| | | |
|---|---|---|
| EP | 2 755 532 | 7/2014 |
| JP | 4-114611 | 4/1992 |
| JP | 2008-175421 | 7/2008 |
| KR | 10-0201050 | 6/1999 |
| KR | 10-2012-0115212 | 10/2012 |
| WO | WO 2014/019018 | 2/2014 |
| WO | WO 2015/056284 | 4/2015 |

OTHER PUBLICATIONS

European Search Report dated Dec. 21, 2018.

\* cited by examiner

COOKING APPLIANCE AND METHOD FOR CONTROLLING COOKING APPLIANCE

CROSS-REFERENCE TO RELATED PATENT APPLICATIONS

This application is a U.S. National Stage Application under 35 U.S.C. § 371 of PCT Application No. PCT/KR2016/004527, filed Apr. 29, 2016, which claims priority to Korean Patent Application No. 10-2015-0065906, filed May 12, 2015, whose entire disclosures are hereby incorporated by reference.

FIELD

Embodiments of the present disclosure relate to a cooling appliance and a method for controlling the same, more particularly, to a cooking appliance which facilitates sous vide cooking for foods within a simple cooking chamber and a method for controlling the same.

BACKGROUND

Generally, cooking appliances may mean electric appliances for cooking in a house or a building, using electricity or other energies (i.e., gas).

A new cooking appliance having an added steam function for supplying steam to cooked foods so as to supplement the moisture evaporated during the cooking process has been released.

Especially, the cooking appliance having the steam function is configured to facilitate cooking only by injecting hot steam into a cooking chamber.

In recent, sous vide cooking is performed which is French for "under vacuum" meaning as a low temperature vacuum cooking method so as to improve the flavor and fragrance of cooked foods.

Meanwhile, to realize such sous vide cooking, cooking objects have to be provided in a vacuum space and cooking for the objects has to be performed for a relatively long time period in a preset range of temperatures.

For example, Europe Patent No. EP02755532A1 discloses "COOKING APPLIANCE AND METHOD FOR CONTROLLING COOKING APPLIANCE" only for sous vide cooking.

A conventional sous vide cooking appliance uses a water-heating method in which heats water after a cooking pack having a cooking food vacuum-treated to be closed airtight by using an auxiliary vacuum treating unit is put in a chamber provided with water.

The conventional sous vide cooking appliance has a disadvantage of dishes only for the sous vide cooking.

Moreover, the conventional sous vide cooking appliance has to use water so as to heat the cooking objects so that it may requires an air-tight-closed chamber for accommodating the water.

Also, the vacuum treating unit independently provided from the cooking appliance has to be used in treating and closing the cooking pack inconveniently and disadvantageously.

DETAILED DESCRIPTION OF THE INVENTION

Technical Problem

To overcome the disadvantages, an object of the present disclosure is to provide a cooking appliance having a steam function which may perform sous vide cooking, even with no cooking dishes only for the sous vide cooking.

Another object of the present disclosure is to provide a cooking appliance having a steam function which may heat cooking objects, not the water, by using a heating means so as to perform sous vide cooking.

A further object of the present disclosure is to provide a cooking appliance which may perform vacuum treatment for a cooking pack and the sous vide cooking, even without any auxiliary vacuum treating unit.

Technical Solution

To achieve these objects and other advantages and in accordance with the purpose of the embodiments, as embodied and broadly described herein, a cooking appliance comprises a cabinet defining a cooking chamber; a heating means installed in the cabinet and configured to heat an internal space of the cooking chamber; an air pump installed in an outer surface of the cabinet and comprising a tube partially extended into the cooking chamber; a cooking pack selectively arranged in the cooking chamber and configured to accommodate a cooking object; and a control unit configured to control the heating means and the air pump.

The internal space of the cooking pack may be vacuum-treated by the drive of the air pump for a preset time period before a cooking cycle starts.

The vacuum treatment of the cooking pack and the cooking cycle may be performed in a single cooking chamber.

A cooking pack fastening portion having a first screw thread may be provided in the cooking pack, and a tube fastening portion having a second screw thread configured to be fastened to the cooking pack fastening portion may be provided in the tube, and the cooking pack and the tube may communicate with each other via the cooking pack fastening portion and the tube fastening portion.

The tube may comprise a first tube configured to facilitate the communication between the air pump and the cooking pack; and a second tube configured to exhaust the air sucked by using the air pump outside, and the tube fastening portion is provided in a free end of the first tube.

The cooking appliance may further comprise an exhaust duct configured to exhaust internal air of the cooking chamber outside, wherein the second tube is provided between the air pump and the exhaust duct.

The exhaust duct and the air pump may be arranged in the same lateral surface of the cabinet.

The cooking appliance may further comprise a connector provided in one wall of the cabinet, wherein at least predetermined area of the tube is guided into the cooking chamber provided in the cabinet via the connector.

Sealing may be performed between one wall of the cabinet and the connector and between the connector and the tube penetrating the connector.

The cooking appliance may further comprise a temperature sensor configured to measure the temperature in the cooking chamber, wherein the control unit controls the drive of the heating means based on a signal sensed by the temperature sensor so as to keep temperatures in the cooking chamber within a preset range during the cooking cycle.

The preset range of the temperatures may be from 55° C. to 65° C.

The heating means may be a steam generator and the control unit may be configured to control a steam heater provided in the steam generator.

In another aspect of the present disclosure, a method for controlling a cooking appliance comprising a cabinet defining a cooking chamber; a heating means installed in the cabinet and configured to heat an internal space of the cooking chamber; an air pump installed in an outer surface of the cabinet and comprising a tube partially extended into the cooking chamber; a cooking pack selectively arranged in the cooking chamber and configured to accommodate a cooking object; and a control unit configured to control the heating means and the air pump, the method comprises a sous vide cook preparing step for connecting the cooking pack accommodating the cooking object with the tube provided in the air pump; a cook mode inputting step for inputting a sous vide cook mode out of a plurality of cook modes; an air pump driving step for driving the air pump for a preset time period to as to vacuum-treat the cooking pack; and a sous vide cook performing step for driving the heating means so as to keep the temperature in the cooking chamber within a preset range of temperatures.

The cooking pack vacuum treatment of the air pump driving step and the sous vide cook performing step may be performed in a single cooking chamber.

In the sous vide cook performing step, the control unit may control the drive of the heating means based on a signal sensed by the temperature sensor so as to keep temperatures in the cooking chamber within a preset range during the cooking cycle.

Advantageous Effects

The embodiments have following advantageous effects. The cooking appliance having the steam function is capable of performing sous vide cooking, even with no cooking dishes only for the sous vide cooking.

Furthermore, the cooking appliance heats the cooking object by using steam, not water, so as to require no high-priced sealed chamber for accommodating water. Accordingly, the unit cost of products may be reduced.

Still further, the cooking appliance is capable of performing the vacuum treatment for the cooking pack and the sous vide cooking, even without any auxiliary vacuum treating unit.

DESCRIPTION OF SPECIFIC EMBODIMENTS

A cooking appliance in accordance with exemplary embodiments of the present disclosure will be described in detail, referring the companying drawings. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

Figure 1:
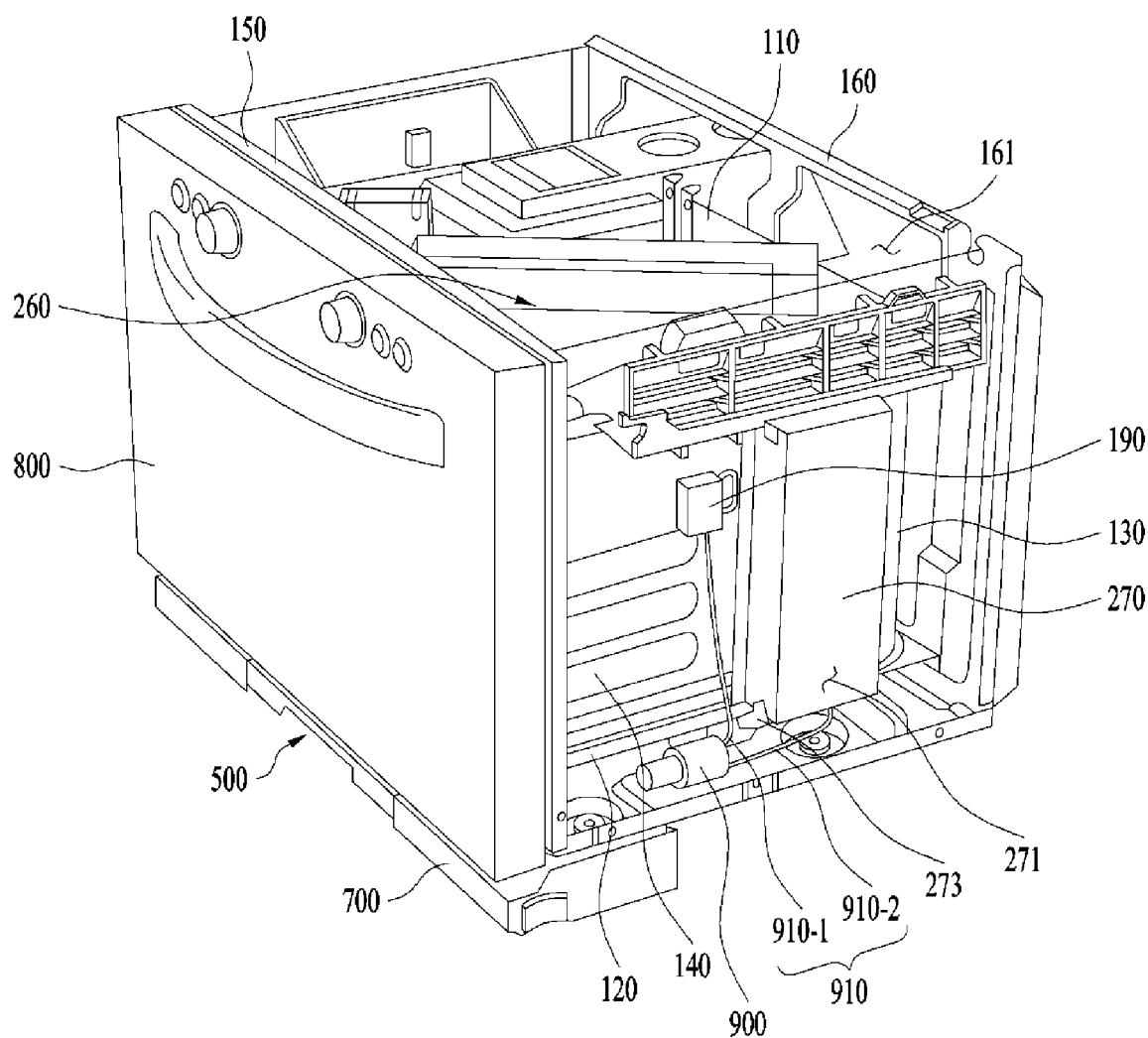
FIG. 1 is a perspective diagram of a cooking appliance in accordance with one embodiment of the present disclosure.
Figure 2:
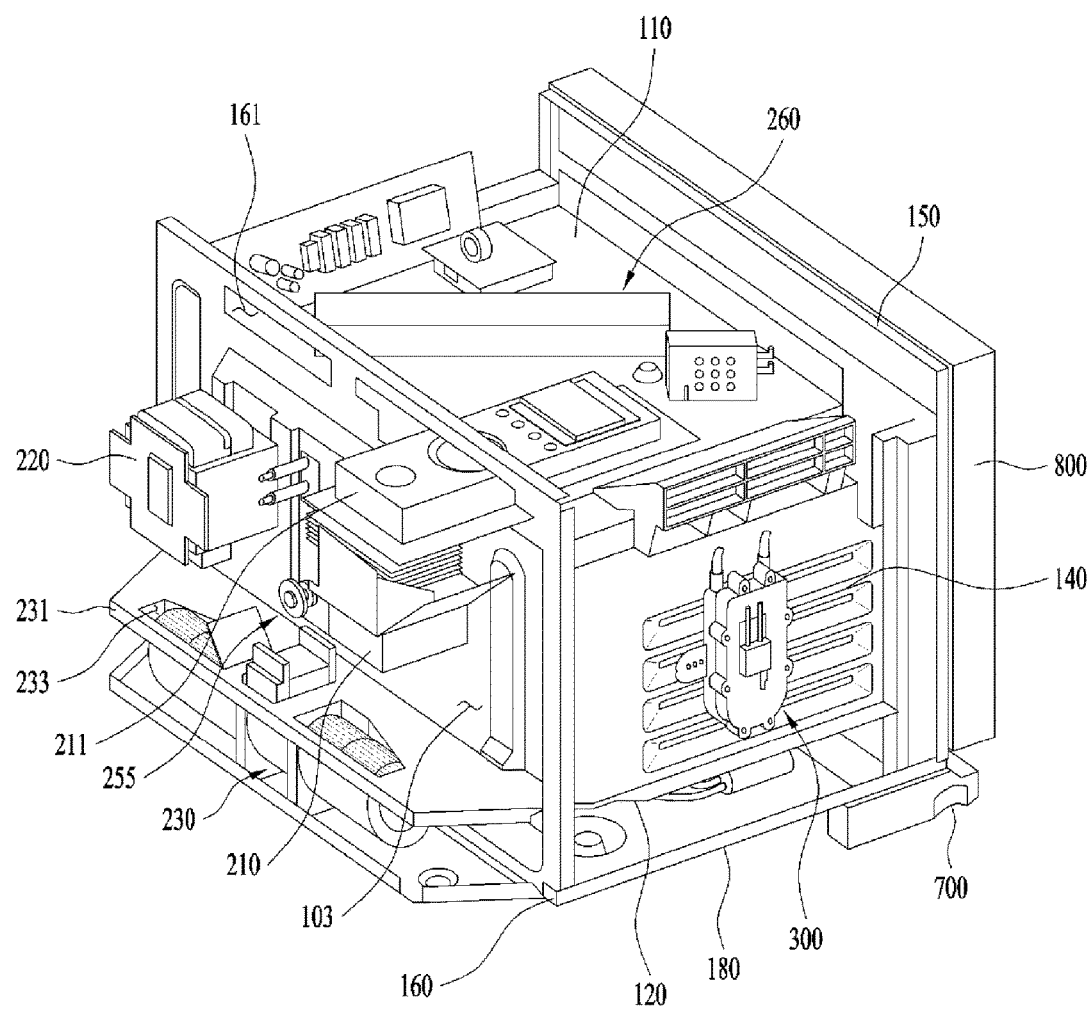
FIG. 2 is a perspective diagram of the cooking appliance shown in FIG. 1, viewed from a different angle.
Figure 3:
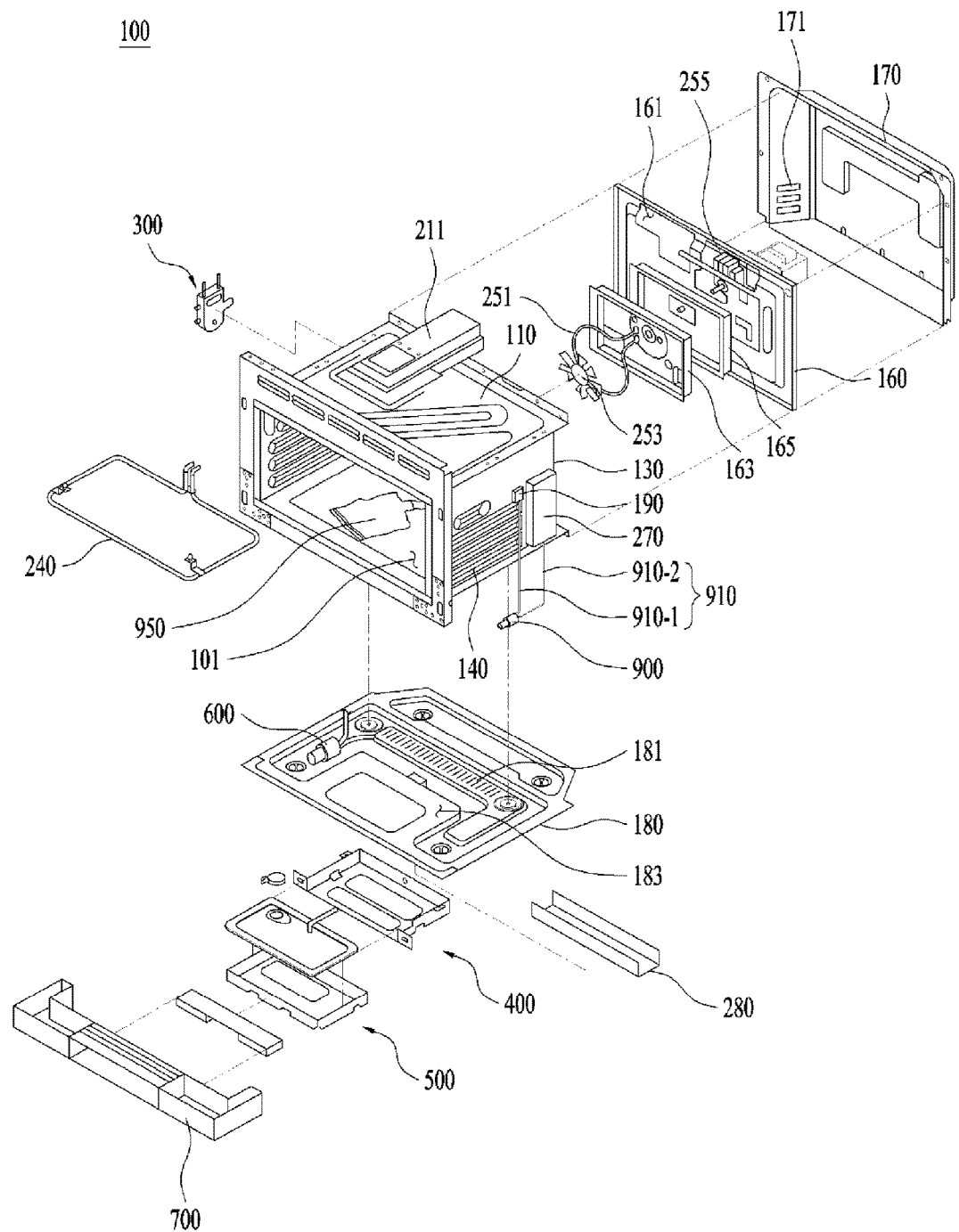
FIG. 3 is an exploded perspective diagram of the cooking appliance shown in FIG. 1.

FIG. 1 is a perspective diagram of a cooking appliance in accordance with one embodiment of the present disclosure. FIG. 2 is a perspective diagram of the cooking appliance shown in FIG. 1, viewed from a different angle. FIG. 3 is an exploded perspective diagram of the cooking appliance shown in FIG. 1.

For convenient and easy explanation, X-axial direction is defined as a width (right-and-left) direction of the cooking appliance. Y-axial direction is defined as a height (vertical) direction of the cooking appliance. Z-axial direction is defined as a back-and-forth direction of the cooking appliance.

Referring to FIGS. 1 through 3, the cooking appliance 100 in accordance with one embodiment of the present disclosure may include a cabinet 110, 120, 130 and 140 which defines a cooking chamber 101.

In other words, the cooking chamber 101 in which cooking objects are cooked may be provided in the cabinet 110, 120, 130 and 140.

The cabinet 110, 120, 130 and 140 may include an upper plate 110 defining a top surface; a bottom plate 120 defining a bottom surface; a rear plate 130 defining a rear surface; and a side plate 140 defining a width-direction lateral surface.

Although not shown in the drawings, the upper plate 110 and the side plate 140 may be shut off by an outer case, so that the outer case may be formed to have an approximately "⊏"-shaped longitudinal cross section.

More specifically, the cabinet 110, 120, 130 and 140 may be formed in a polygonal shape with an open front. The upper plate 110 may define a rear surface of the cooking chamber 101 and the side plate 140 may define both lateral surfaces of the cooking chamber 101.

An irradiation hole (not shown) and a porosity unit (not shown) are formed in the upper plate 110. The irradiation hole is employed to irradiate the microwaves generated in a magnetron 210 into the cooking chamber 101. The magnetron 210 will be described in detail later. The porosity unit (not shown) is employed to transmit the energy, in other words, light and heat of a halogen heater 260 to the cooking chamber 101. The halogen heater 260 will be described in detail later.

A plurality of inlet holes (not shown) and a plurality of outlet holes (not shown) are formed in the rear plate 130. The inlet holes may be configured to lead air in from the cooking chamber 101 into a convection chamber which will be described later. The outlet holes may be configured to lead air out from the convection chamber into the cooking chamber 101.

In other words, the cooking chamber 101 and the convection chamber are substantially in communication by the inlet holes and the outlet holes.

A plurality of cooking chamber exhaust holes (not shown) may be formed in one of the side plates 140, specifically, a right side plate 140 shown in FIG. 1 in the illustrated embodiment.

The cooking chamber exhaust holes may function as exits for the air supplied to the cooking chamber 101 via the irradiation hole together with the microwaves outside.

A steam injection hole (not shown) may be formed in one of the side plates 140, specifically, a left side plate 140 shown in FIG. 1 in the illustrated embodiment. The steam injection hole is configured to supply the steam generated in a steam generator 300 which will be described later into the cooking chamber 101.

A front plate 150 and a back plate 150 may be provided in a front surface and a rear surface of the cabinet 110, 120, 130 and 140, respectively. The front plate 150 has one surface substantially fixed to front ends of the upper, bottom and side plates 110, 120 and 140. The back plate 160 has a front surface partially fixed to a predetermined area of the rear plate 130.

The front plate 150 and the back plate 160 are extended from the cabinet 110, 120, 130 and 140 in all directions outwardly.

A communication hole 161 may be formed in an upper end of the back plate 160 extended upwardly. The communication hole 161 may make a top of the cabinet 110, 120, 130 and 140 communicate with an electric control chamber which will be described later.

Meanwhile, a convection cover 163 and an insulator 165 may be provided in a rear surface of the rear plate 130. The convection cover 163 is fixed to a rear surface of the rear plate 130 to form a convection chamber between the rear surface of the rear plate 130 and the front surface of the convection cover 163. The insulator 165 is fixed to the rear surface of the rear plate 130 to shut off the convection cover 163.

Moreover, a back cover 170 is provided in the rear surface of the back plate 160. The back cover 170 is fixed to the rear surface of the back plate 160 to shut off the area of the back plate 160 having at least the communication hole 161. A plurality of suction holes 171 may be formed in a lower end of each side surface of the back cover 170. The suction holes 171 may function as entrances for the air sucked into the cooking appliance by the drive of a cooling fan 230 which will be described later.

A base plate 180 is provided in a bottom of the cabinet 110, 120, 130 and 140. The base plate 180 has a top surface fixed to lower ends of the front plate 150, back plate 160 and back cover 170. An exhaust hole 181 may be formed in the base plate 180 forwardly spaced a preset distance apart from the lower end of the back plate 160.

The exhaust hole 181 may function as the exit for the air flowing in the cooking appliance by the drive of the cooling fan 230 outside. The exhaust hole 181 may be formed in a rectangular shape longer right and left, for example. The condensate water formed by the condensed steam contained in the air exhausted from the cooking chamber exhaust hole may be exhausted via the exhaust hole 181. Although not shown in the drawings, a leg (not shown) may be provided in a bottom surface corner of the base plate 180.

A housing coupling portion 183 is formed in the base plate 180. Some are of the base plate 180 corresponding to a front of the exhaust hole 181 is projected upwardly to form the housing coupling portion 183. A tank housing 400 which will be described later is coupled to the housing coupling portion 183 and a through hole (not shown) is formed in a rear end of the housing coupling portion 183.

The electric control chamber is formed among a rear surface of the back plate 160, a front surface of the back cover 170 and an upper surface of the base plate 180. A plurality of electronic components 210 and 220 and a cooling fan 230 are loaded in the electric control chamber.

More specifically, a magnetron 210 is loaded in the electric control chamber. The magnetron 210 is configured to laser the microwaves irradiated into the cooking chamber 101.

A high voltage transformer 220 is loaded in the electric control chamber and configured to apply high-voltage currents to the magnetron 210. A waveguide 211 may be provided in the top surface of the cabinet 110, 120, 130 and 140, in other words, the upper plate 110 to guide the microwaves lasered from the magnetron 210 toward the inside of the cooking chamber 101.

The cooling fan 230 is installed in the electric control chamber corresponding to the area under the magnetron 210 and the high voltage transformer 220. The cooling fan 230 is configured to form the air flow circulating in the cooking chamber. The cooling fan 230 includes two fans and one fan motor for driving the fan. A sirocco fan configured to suck air in an axial direction and exhaust the air in a circumferential direction may be used as the cooling fan 230.

The air suction portion formed in one end in an axial direction of the cooling fan 230 is located near the suction hole 171 and the air exhaust portion formed in some area of the circumference of the cooling fan 230 is installed toward the upward direction.

Accordingly, the cooling fan 230 is configured to suck the air via the air suction portion 171 and exhaust the air toward the electric control chamber.

An air barrier 231 for preventing the exhausted air from being re-sucked into the cooling fan 230 may be provided in the electric control chamber. The air barrier 231 partitions the internal space of the electric control chamber into an area in which the electronic components including the magnetron 210 and the high voltage transformer 220 are loaded and an area in which the cooling fan 230 is loaded. An exhaust open hole 233 is formed in the air barrier 231, corresponding to the air exhaust portion of the cooling fan 230.

Meanwhile, an upper heater 240 is installed in an upper portion of the cooking chamber 101. The upper heater 240 is configured to provide the heat for radiative-heating the cooking objects in the cooking chamber 101. A sheath heater is used as the upper heater 240.

A convection heater 251 and a convection fan 253 may be provided in the convection chamber. The convection heater 251 is configured to provide the heat used in convection-heating the cooking objects in the cooking chamber 101.

The convection fan 253 may form the air flow circulating the cooking chamber 101 and the convection chamber. More specifically, when the convection fan is driven, air is circulated in the cooking chamber 101 and the convection chamber via the inlet holes and the outlet holes, so that the heat of the convection heater 251 may be convected into the cooking chamber 101 by the convection fan 253.

The convection fan 253 may be operable according to the operation of the steam generator 300, independent from the operation of the convection heater 251.

A convection motor 255 is installed in the electric control chamber and configured to provide a driving force for the drive of the convection fan 253. The convection motor 255 is also cooled by the cooling fan 230.

Meanwhile, a halogen heater 260 is installed in the upper plate 110 and configured to provide light and heat to the cooking chamber 101 via the porosity unit. The halogen heater 260 is shut off by a reflector and a heater cover.

In addition, a lamp 290 is installed in the upper plate 110 and configured to lighten the internal space of the cooking chamber 101.

An exhaustion duct 270 is provided in the side plate 140 located on the right in FIG. 1 showing the cooking chamber exhaust holes. The exhaust duct 270 is employed to guide the air exhausted via the cooking chamber exhaust holes, in other words, the air exhausted after circulated in the cooking chamber 101 toward the exhaust hole 181. For that, the exhaust duct 270 is formed in the side plate 140 in a polyhedron shape with an open surface to shut off the cooking chamber exhaust holes. An air outlet 271 is formed in a bottom surface of the exhaust duct 270.

Meanwhile, the exhaust duct 270 is configured to form condensate water by condensing the steam contained in the air exhausted from the cooking chamber 101. For that, the exhaust duct 270 is formed to reduce an air flow cross section area exhausted from the cooking chamber 101. For example, the air outlet 271 is partially shut off so as to expect the same effect with the effect of the reduced air flow cross section area.

In the illustrated embodiment, a shut-off rib 273 is provided in the exhaust duct 270 to partially shut off the air outlet 281. The shut-off rib 273 is extended from one side of the exhaust duct 270 corresponding to the air outlet 271 toward the exhaust hole 181 downwardly.

Also, a guide duct 280 is provided in the bottom surface of the base plate 180 and configured to guide the air exhausted from the cooking appliance toward a preset direction. In the illustrated embodiment, the guide duct 280 is formed in a polyhedron shape with an open top and both open side surfaces so as to guide the air exhausted via the exhaust hole 181 toward the sides of the cooking appliance.

The condensate water condensed from the air flowing in the exhaust duct 270 after exhausted from the cooking chamber 101 may be collected in the guide duct 280. The condensate water collected in the guide duct 280 may be evaporated by the air exhausted via the exhaust hole 181 or flow down via both ends of the guide duct 280.

Meanwhile, a steam generator 300 may be installed in the cabinet 110, 120, 130 and 140 and configured to supply steam to the cooking chamber 101. For example, the steam generator 300 may be installed in the side plate 140 shown on the left in FIG. 1. The steam generator 300 may generate the steam which will be supplied to the cooking chamber 101.

A tank housing 400 is installed beneath the base plate 180, more specifically, the housing coupling portion 183. The tank housing 400 may be formed in a polyhedron shape with at least one open surface. In the illustrated embodiment, the tank housing 400 is formed in the polyhedron shape with an open front surface and an open top surface.

A water supply tank 500 is retractable with respect to the tank housing 400 and the water which will be supplied to the steam generator 300 to make steam is stored in the water supply tank 500.

A water supply pump 600 is provided between the bottom plate 120 and the base plate 180 and configured to pump the water for steam stored in the water supply tank 500 toward the steam generator 300.

A water condensate tray 700 is installed in a front end of the bottom surface of the base plate 180 and configured to collect the water condensate exhausted into the space defined between the front surface of the front plate 150 and a rear surface of a door 800 which will be described later.

It is preferred that a front surface of the water condensate tray 700 is located on the same plane with the front surface of the door 800, in a state where the door 800 closed the cooking chamber 101. A through-opening 701 penetrating the water supply tank 500 is formed in the front surface of the water condensate tray 700 to allow the water supply tank 500 moving into and out from the tank housing 400 to pass there through.

The cooking chamber 101 may be selectively open and closed by the door 800. For example, the door 800 is provided as a pull-down type of which an upper end is rotatable on a lower end to open and close the cooking chamber 101.

The cooking appliance 100 in accordance with the illustrated embodiment may include a plurality of cooking modes. For example, the plurality of the cooking modes may include a broiling mode, warm-up mode, a sous vide cooking mode and the like.

In this instance, to realize the sous vide cooking, the cooking appliance 100 in accordance with the illustrated embodiment may further include an air pump 900 installed in the cabinet 110, 120, 130 and 140; and a cooking pack 950 selectively arranged in the cooking chamber 101.

The air pump 900 and the cooking chamber 101 may be controllable by a control unit (C) which will be described later.

The air pump 900 may include a tube 910 installed in an outer surface of the cabinet 110, 120, 130 and 140, with a predetermined portion extended into the cooking chamber 101. At this time, the tube 910 may be formed of a flexible and heat-resistant material.

The extended portion of the tube 910 reaches the internal space of the cooking chamber 101 through one wall of the cabinet 110, 120, 130 and 140. For example, the at least extended portion of the tube 910 may be guided into the cooking chamber 101 via a connector 190 provided in one wall of the cabinet 110, 120, 130 and 140. More specifically, the portion of the tube 910 may be provided in the right side plate 140 having the exhaust duct 270 installed therein.

In this instance, it is preferred that the gap between the wall of the cabinet and the connector 190 and the gap between the connector 190 and the tube 910 penetrating the connector 190 may be sealed airtight.

The cooking pack 950 may be selectively arranged in the cooking chamber 101 and configured to accommodate a cooking object. One side of the cooking pack 950 may be detachable from a free end of the tube 910.

For example, the cooking pack 950 is provided as one component used in the sous vide cook mode. When a user tries to operate the cooking appliance 100 in the sous vide cook mode, the cooking pack 950 may be arranged in the cooking chamber 101 by the user. The user is able to connect one side of the cooking pack 950 to the free end of the tube 910 extended into the cooking chamber 101.

Before starting a cooking cycle, the pump is driven for a preset time period and an internal space of the cooking pack 950 is vacuum-treated. In other words, the internal space of the cooking pack 950 has to be vacuum-treated in a state of accommodating the cooking object. At this time, the internal space of the cooking pack 950 accommodating the cooking object may be vacuum-treated by the drive of the pump, before the cooking cycle of the sous vide cook mode starts.

The vacuum-treatment of the cooking pack inside and cooking cycle may be performed in the cooking chamber 101. Accordingly, the conventional vacuum treatment process configured of the two steps of performing the vacuum treatment of the cooking pack 950 accommodating the cooking object in the auxiliary vacuum treatment unit and then putting the vacuum-treated cooking pack 950 in the cooking chamber 101 may be simplified into one process performed in the single cooking chamber.

Hereinafter, referring to other drawings, the structure for detachably coupling the cooking pack 950 to the tube 910 mentioned above will be described.

Figure 4:
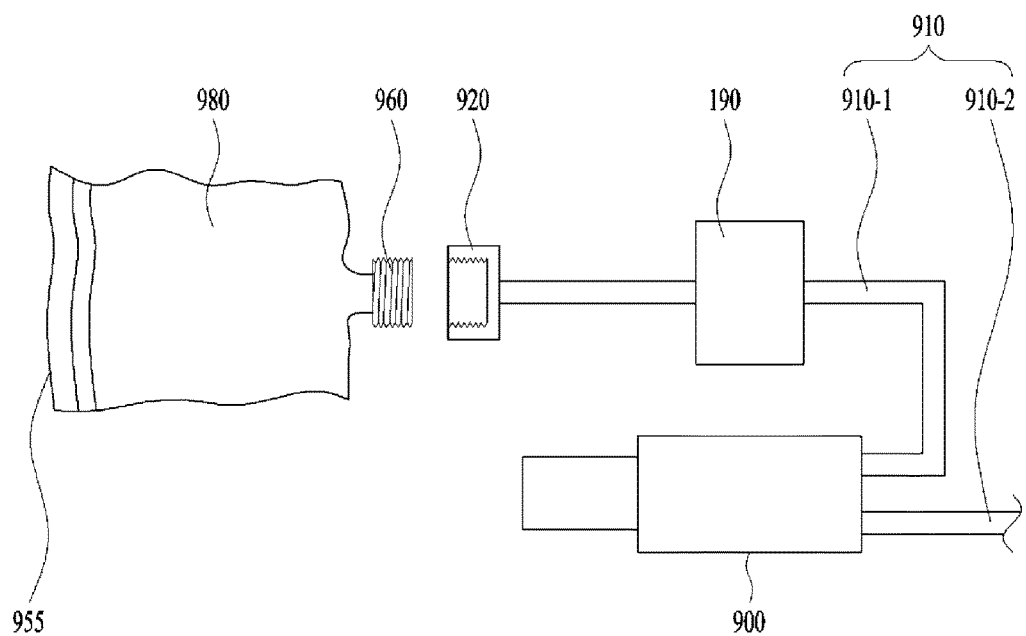
FIG. 4 is a schematic diagram illustrating one embodiment of a connection structure of a nozzle provided in a pump with a cooking pack.

FIG. 4 is a schematic diagram illustrating one embodiment of a connection structure between a nozzle provided in the pump and the cooking pack.

Referring to FIGS. 1 through 4, an introduction portion 955 may be formed in the cooking pack 950 to introduce the cooking object. The introduction opening 955 may be formed in a zipper type which is generally well-known. After the cooking object is introduced into the cooking pack 950 via the introduction opening 955, the introduction opening 955 is zipped up to close the cooking pack 950 airtight.

For example, the cooking pack 950 may be formed in a vinyl pack for vacuum treatment which is well-known knowledge.

The cooking pack 950 may include a cooking pack fastening portion 960 having a first screw thread 961. The tube 910 may include a tube fastening portion 920 having a second screw thread 921 configured to be fastened to the cooking pack fastening portion 960.

Accordingly, the cooking pack 950 and the tube 910 may be in communication by the cooking pack fastening portion 960 and the tube fastening portion 920.

For example, the first screw thread 961 is formed in an outer circumference of the cooking pack fastening portion and the second screw thread 961 is formed in an inner circumference of the corresponding tube fastening portion 920. In other words, the fastening between the first screw thread 961 and the second screw thread 961 allows the cooking pack fastening portion 960 to be coupled to the tube fastening portion 920.

Accordingly, the cooking pack 950 and the tube 910 may be in communication with each other and the connected portion between the cooking pack 950 and the tube 910 may be sealed by the fastening between the cooking pack fastening 960 and the tube fastening portion 920.

More specifically, the tube 910 may include a first tube 910-1 formed to facilitate the communication between the air pump 900 and the cooking pack 950; and a second tube 910-2 configured to exhaust the air sucked by the air pump 900 outside.

In this instance, the tube fastening portion 920 may be provided in a free end of the first tube 910-01. In other words, the first tube 910-1 may be extended from the air pump 900 toward the internal space of the cooking chamber 101 through the connector 190 mentioned above. The first tube 910-1 may function as an inlet channel configured to guide the internal air of the cooking pack 950 sucked by using the air pump 900.

The material used in forming the extended area of the first tube 910-1 into the cooking chamber 101 of the first tube 910-1 may be different from the material used in forming the extended portion outside the cooking chamber 101 with respect to the connector 190.

For example, the predetermined area of the first tube 910-1 extended to the internal space of the cooking chamber 101 with respect to the connector 190 may be formed of a relatively high heat-resistant material and the other area extended to the outer space of the cooking chamber 101 may be formed of a relatively low heat-resistant material.

Moreover, the extended area to the internal space of the cooking chamber 101 and the extended area of the first tube 190-1 to the external space of the cooking chamber 101 may integrally formed with each other as one tube.

Alternatively, the extended area of the first tube 910-1 to the internal space of the cooking chamber 101 with respect to the connector 190 and the extended area to the external space of the cooking chamber 101 may be formed as independent tubes to be connected with each other by the connector 190.

The second tube 910-2 may be provided between the air pump 900 and the exhaust duct 270 mentioned above. In other words, the second tube 910-2 may be formed to allow communication between the air pump 900 and the exhaust duct 270 and function as an outlet channel configured to guide the air exhausted by using the air pump 900.

Accordingly, the internal air of the cooking pack 950 sucked by using the air pump 900 is guided toward the air pump 900 along the first tube 910-1 and then guided toward the exhaust duct 270 along the second tube 910-2.

The exhaust duct 270 and the air pump 900 may be arranged in the same lateral surface of the cabinet 110, 120, 130 and 140. For example, the exhaust duct 270 and the air pump 900 may be arranged in a right side plate 140 shown in FIG. 1.

More specifically, the air pump 900 may be installed on the base plate 180 and located adjacent to the right side plate 140 having the exhaust duct 270 installed therein. At this time, one end of the second tube 910-2 is connected with the air pump 900 and the other end is connected with a lower surface of the exhaust duct 270. Accordingly, the length of the second tube 910-2 connecting the air pump 900 and the exhaust duct 270 with each other may be minimized.

Next, referring to other drawings, the connection relation among the key components (the control unit, the heater, the sensor and the like) provided in the cooking appliance will be described in detail.

Figure 5:
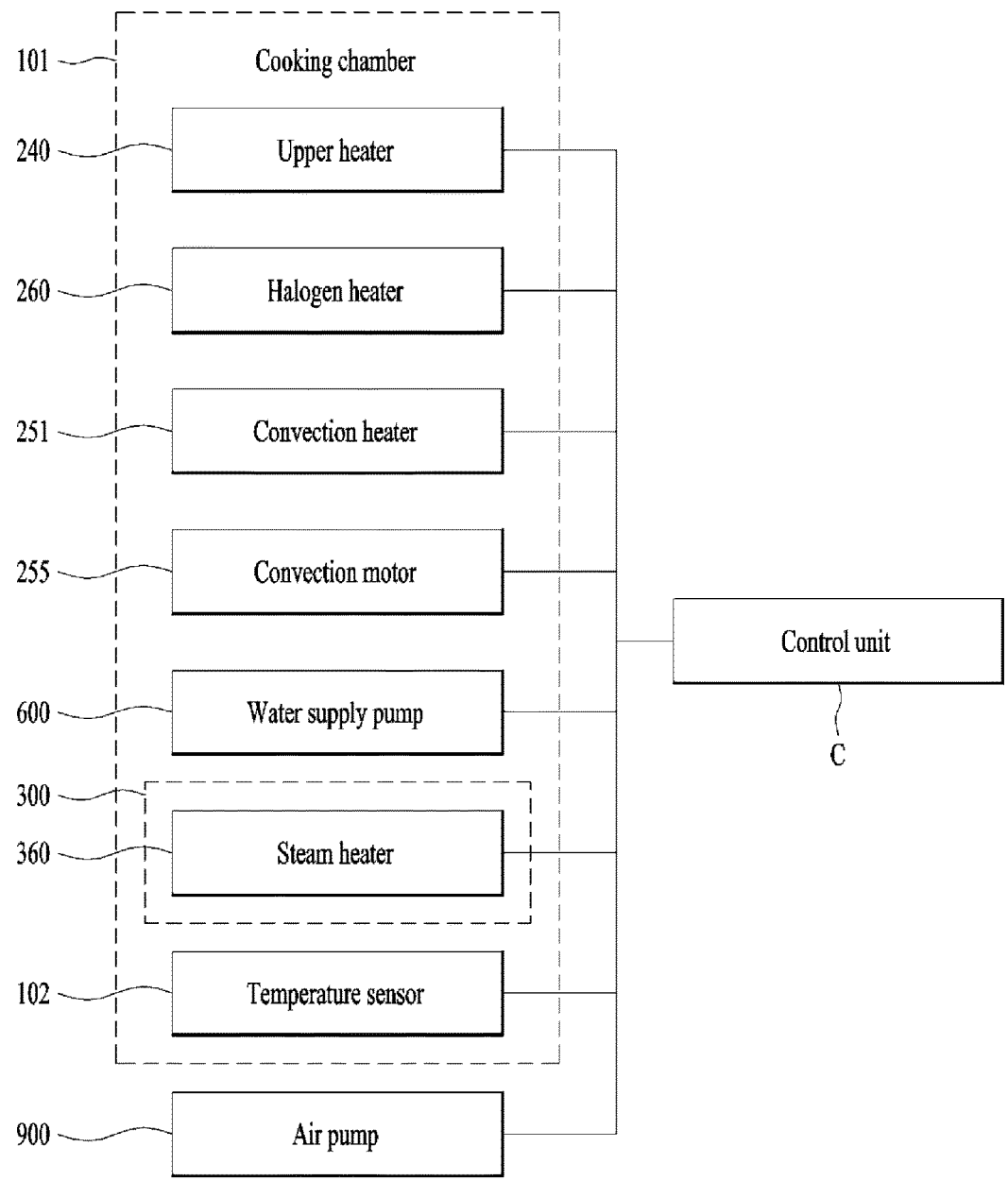
FIG. 5 is a diagram schematically illustrating a connection relation among components provided in the cooking appliance shown in FIG. 1.

FIG. 5 is a diagram schematically illustrating a connection relation among components provided in the cooking appliance shown in FIG. 1.

Referring to FIG. 5, the components which are controllable to cook the cooking objects arranged in the cooking chamber 101 may include an upper heater 240, a halogen heater 260, a convection heater 251, a convection fan 253, a magnetron 210, a steam heater 360 and a water supply pump 600.

In other words, the upper heater an upper heater 240, the halogen heater 260, the convection heater 251, the convection fan 253, the magnetron 210, the steam heater 360 and the water supply pump 600 may be controlled by the control unit (C). That is, the upper heater an upper heater 240, the halogen heater 260, the convection heater 251, the convection fan 253, the magnetron 210, the steam heater 360 and the water supply pump 600 may be electrically connected with the control unit (C).

Hereinafter, the function of the control unit (C) in case of supplying steam to the cooking chamber 101 will be described in detail.

First of all, the control unit (C) puts at least one of the upper heater 240 and the halogen heater 260, once the steam heater 360 is put into operation to supply steam to the cooking chamber 101. That is to prevent the steam supplied to the cooking chamber 101 from being delivered to the halogen heater 260 via the porosity unit for transmit the light and heat of the halogen heater 260.

In this instance, the operation time of at least one of the upper heater 240 and the halogen heater 260 may be partially overlapped with that of the steam heater 360. At least one of the upper heater and the halogen heater 260 may end the operation at the moment when or after the steam heater 360 ends the operation. The steam is evaporated by the operation of at least one of the upper heater 240 and the halogen heater 260 so as to prevent the steam from being transmitted to the halogen heater 260 via the porosity unit.

Meanwhile, the control unit (C) operates the convection motor 255 regardless of the operation of the convection heater 251, when steam is supplied to the cooling chamber 101 by the operation of the steam heater 360. That is to circulate the steam supplied to the cooking chamber 101 in the cooking chamber 101 uniformly. In other words, the convection motor 255 operates the convection fan 253 to circulate the air in the cooking chamber 101 and substantially circulate steam.

At this time, the operation time of the convection motor 255 is partially overlapped with at least operation time of the steam heater 360. The convection motor 255 ends the operation at the same time when or after the steam heater 360 ends the operation. When the convection heater 251 is used in cooking the cooking object in the cooking chamber 101, the convection motor 255 may also operate.

Moreover, the cooking appliance 100 in accordance with one embodiment of the present disclosure may further include a temperature sensor 102 provided to measure the temperature in the cooking chamber 101; and the air pump 900 provided in an outer portion of the cooking chamber 101.

As mentioned above, the air pump 900 is corresponding to the component for the cooking in the sous vide cook mode.

The control unit (C) may be configured to receive a temperature signal from the temperature sensor 102. Also, the control unit (C) may be implemented to control the air pump 900 based on the signal transmitted by the temperature sensor 102.

In other words, the control unit (C) may be electrically connected with the temperature sensor 102 and the air pump 900.

The upper heater an upper heater 240, the halogen heater 260, the convection heater 251 and the steam generator 300 mentioned above may be used as a heating means for raise the temperature in the cooking chamber 101 in the sous vide cook mode.

The heating means for raising the temperature in the cooking chamber 101 may include the upper heater 240, the halogen 260, the convection heater 251 and the steam generator 300. The steam generator 30 as the heating means may mean the steam heater 360.

In other words, the heating means for raising the temperature in the cooking chamber 101 may be one of the upper heater 240, the halogen heater 260, the convection heater 251 and the steam generator 300.

Considering that the cooking pack 950 mentioned above is made of vinyl, the heating means in the sous vide cook mode may be the steam generator 300.

For example, in cooking the cooking object in the sous vide cook mode, the control unit (C) may control the drive of the heating means based on the signal sensed by the temperature sensor 102 to keep the temperature in the cooking chamber 100 within a preset range of temperatures during the cooking cycle. For example, the control unit (C) may control the drive of the steam generator 300.

In this instance, the preset range of temperatures may be approximately 55-65° C. which is proper to the sous vide cook mode.

It includes the control of the steam heater 360 provided in the steam generator 300 to control the drive of the steam generator 300. In other words, the control unit (C) may be configured to control the drive of the steam heater 360 based on the signal sensed by the temperature sensor 102.

Next, referring to the next drawing, the vacuum treatment operation of the cooking pack for driving the cooking appliance in the sous vide cook mode will be described.

Figure 6:
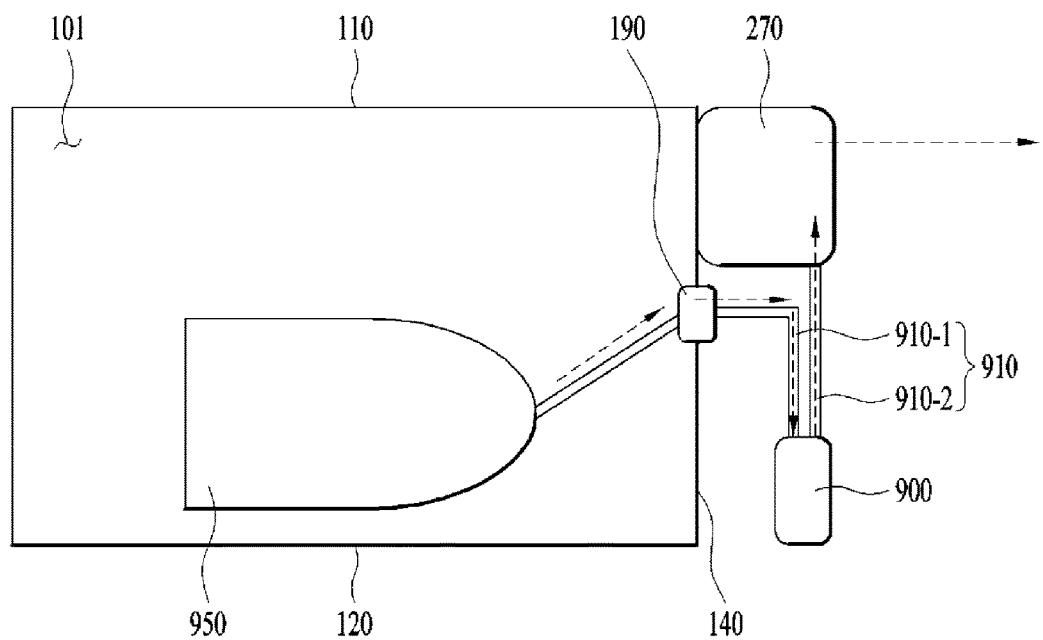
FIG. 6 is a conceptual diagram illustrating an operation principle for vacuum treatment in the cooking appliance shown in FIG. 1.

FIG. 6 is a conceptual diagram illustrating an operation principle for vacuum treatment in the cooking appliance shown in FIG. 1.

For easy explanation sake, the configuration of the heating means (for example, the steam generator 300) is omitted in FIG. 6.

Referring to FIG. 6, the cooking object is introduced into the cooking pack 950 and then one side of the cooking pack 950 is connected with the free end of the first tube 190-1 connected with the pump 900.

The free end of the first tube 190-1 is extended into the cooking chamber 101. The connection between the free end of the first tube 190-1 and the one side of the cooking pack 950 may facilitate the communication between the first tube 190-1 and the internal space of the cooking pack 950.

At this time, the user is able to select the sous vide cook mode out of the cook modes provided in the cooking appliance 100. When the sous vide cook mode is selected, the air pump 900 is driven for a preset time period and the internal space of the cooking pack 950 is vacuum-treated.

The air sucked from the cooking pack 950 may be exhausted outside the cooking appliance 100 along the second tube 910-2 connected with the air pump 900 and the exhaust duct 270.

Hereinafter, referring to the next drawing, the operation principle of the sous vide cook mode in the cooking appliance 100 will be described.

Figure 7:
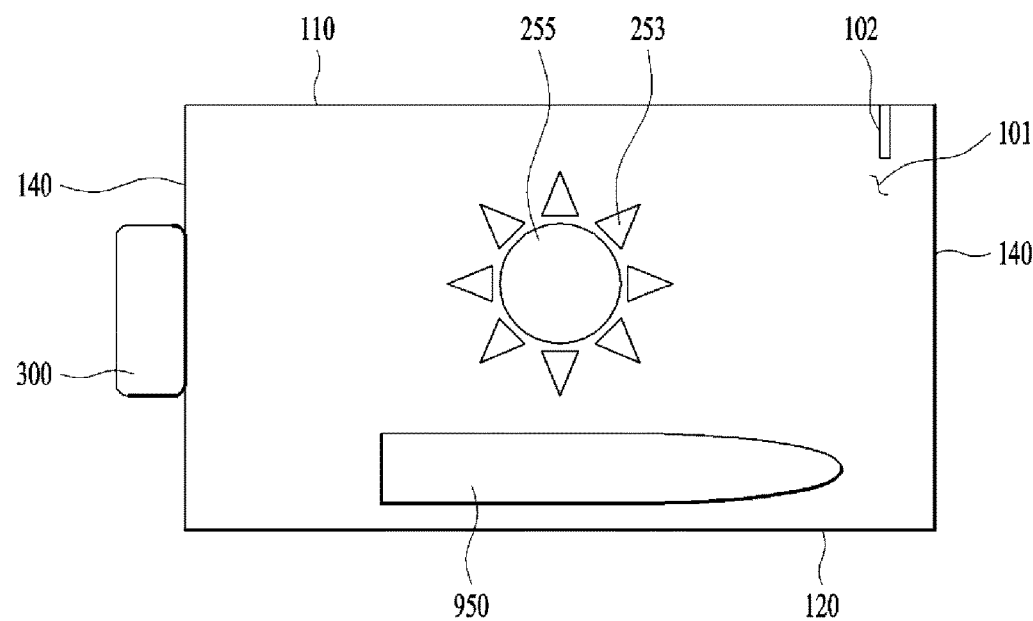
FIG. 7 is a conceptual diagram illustrating an operation principle for sous vide cooking in the cooking appliance shown in FIG. 1.

FIG. 7 is a conceptual diagram illustrating an operation principle for sous vide cooking in the cooking appliance shown in FIG. 1.

For easy explanation sake, the configuration of the air pump 900 and the tube 910 is omitted in FIG. 7 and the steam generator 300 is described as the heating means for heating the internal space of the cooking chamber 101.

More specifically, the heating means for heating the internal space of the cooking chamber 101 in the sous vide cook mode may one of the upper heater 240, the halogen heater 260, the convection heater 251 and the steam generator 300. However, for easy explanation sake, the steam generator 300 is used as the heating means.

Referring to FIG. 7, steam may be injected into the cooking chamber 101 through the operation of the steam generator 300 in a state where the vacuum treatment of the cooking pack 950 is complete. The convection motor 255 may be put into operation to drive the convection fan 253 mentioned above simultaneously together with the drive of the steam generator 300.

At this time, the control unit (C) may control the drive of the steam generator 300 based on the signal transmitted by the temperature sensor 102 configured to measure the temperature in the cooking chamber 101. In other words, the control unit (C) may selectively drive the steam generator 300 to keep temperatures in the cooking chamber 101 within a preset range.

It is required in the sous vide cook mode that the cooking object should be heated for a longer time period (for example, approximately two hours or more) than the normal cooking time period (for example, approximately 30 to 60 minutes) at a lower temperature than a normal cooking temperature (for example, 100° C. or more).

Meanwhile, the configuration of the air pump 900 and the tube 910 is not shown in FIG. 7 for easy explanation sake. While the vacuum treatment is being performed, the connected state of the free end of the tube (in other words, the first tube 190-1) with the one side of the cooking pack 950 may be kept.

As shown in FIG. 7, it is possible to detach the first tube 910-1 from the cooking pack 950 which has been already vacuum-treated before steam is injected into the cooking chamber 101 by using the steam generator 300.

It is possible to perform the sous vide cooking in the single cooking chamber 101 through the vacuum treatment of the cooking pack 950 and the control of the heating means (for example, the steam generator 300) as shown in FIGS. 6 and 7.

Figure 8:
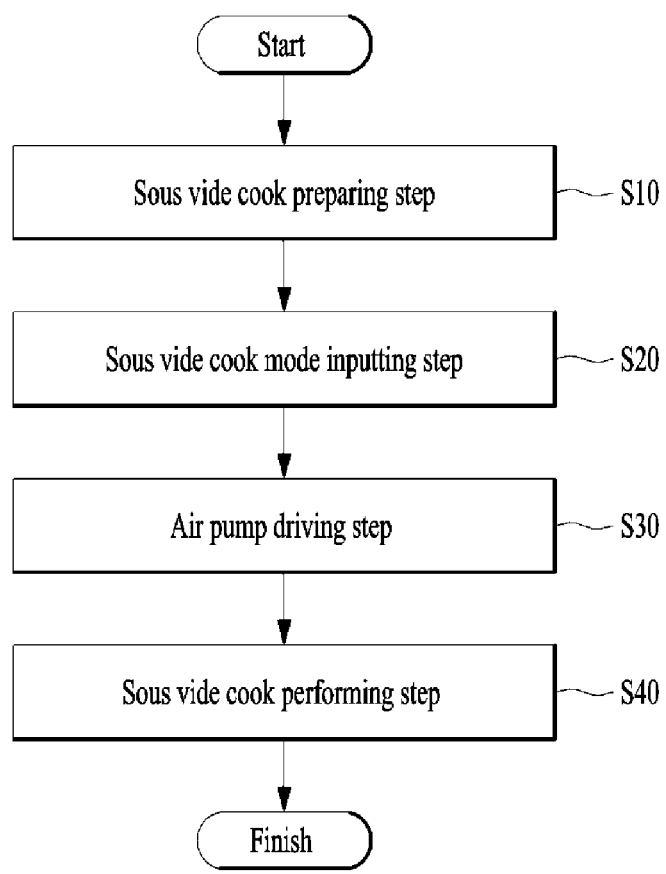
FIG. 8 is a flow chart to control the cooking appliance in accordance with one embodiment of the present disclosure.

FIG. 8 is a flow chart to control the cooking appliance in accordance with one embodiment of the present disclosure.

When explaining the control method of the cooking appliance it is obvious that the configuration of the cooking appliance 100 described referring to FIGS. 1 through 7 should be applied.

Referring to FIG. 8, the control method of the cooking appliance in accordance with one embodiment of the present disclosure may include a sous vide cook preparing step (S10); a sous vide cook mode input step (S20); an air pump driving step (S30); and a sous vide cook performing step (S40).

In the sous vide cook preparing step (S10), the cooking pack accommodating the cooking object may be connected with the tube 910 provided in the air pump 900. After the cooking object is disposed in the cooking pack 950 outside the cooking appliance 100, the cooking pack 950 is connected with the tube 910 extended into the cooking chamber 101 to communicate with the tube 910.

At this time, after the cooking pack 950 is connected with the tube 910, the door 800 is closed by the user and then the cooking chamber 101 is closed airtight.

In the sous vide cook mode inputting step (S20), the user is able to input the sous vide cook mode out of the cook modes provided in the cooking appliance 100.

Once the sous vide cook mode is input, the vacuum treatment of the cooking pack 950 may be performed by the drive of the air pump 900 in the air pump driving step (S30).

In other words, the air pump 900 connected with the cooking pack 950 may be driven for a preset time period so as to perform the vacuum treatment of the cooking pack 950 in the air pump driving step (S30).

After the air pump 900 is driven for the preset time period, the heating means may start to drive in the sous vide cook performing step (S40).

At this time, the heating means may one of the upper heater 240, the halogen heater 260, the convection heater 251 and the steam generator 300. Hereinafter, for easy explanation sake, the steam generator 300 is used as the heating means.

More specifically, in the sous vide cook performing step (S40), the steam generator 300 may be driven to keep the internal space of the cooking chamber 101 within a preset range of temperatures. The preset range of the temperatures may be a range from 55° C. to 65° C. which is proper to the sous vide cooking.

At this time, to keep the temperatures in the cooking chamber 101 in the preset range in the sous vide cook performing step (S40), the control unit (C) may control the drive of the steam generator 300 based on the signal transmitted by the temperature sensor 102.

Meanwhile, the vacuum treatment of the cooking pack 950 in the air pump driving step (S30) and the sous vide cook performing step (S40) may be performed in the single cooking chamber 101. Accordingly, the sous vide cooking may be enabled through the simplified process, compared with the conventional sous vide cooking in which the vacuum treatment of the cooking pack 950 is performed in an independent chamber.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

INDUSTRIAL APPLICABILITY

The industrial applicability of the present disclosure is mentioned in the description of the specific embodiments.

What is claimed is:
1. A cooking appliance comprising:
a cabinet defining a cooking chamber, wherein the cabinet has a base plate and an exhaust hole is formed in the base plate;
a heating means installed on the cabinet and configured to heat an internal space of the cooking chamber;
an air pump installed at an outer surface of the cabinet and comprising a tube partially extended into the cooking chamber;
a cooking pack selectively arranged in the cooking chamber and configured to accommodate a cooking object;
a connector provided in one wall of the cabinet, wherein at least a predetermined area of the tube is guided into the cooking chamber provided in the cabinet via the connector;
an exhaust duct configured to exhaust internal air of the cooking chamber outside of the cooking appliance; and
a control unit configured to control the heating means and the air pump, wherein the tube includes a first tube configured to facilitate communication between the air pump and the cooking pack via the connector and a second tube configured to facilitate communication between the air pump and the exhaust duct, wherein the second tube is connected to the first tube via the air pump, wherein the cooking pack is connected to the first tube through the connector, wherein the exhaust duct has an air outlet formed in a bottom surface thereof, wherein the second tube is configured to exhaust the air sucked by the air pump to the air outlet of the exhaust duct, and wherein the air suctioned from the cooking pack is exhausted outside of the cooking appliance along the first tube and the second tube, and through the exhaust hole.

2. The cooking appliance of claim 1, wherein the internal space of the cooking pack is vacuum-treated by driving the air pump for a preset time period before a cooking cycle starts.

3. The cooking appliance of claim 2, wherein vacuum treatment of the cooking pack and the cooking cycle are performed in a single cooking chamber.

4. The cooking appliance of claim 1, further comprising:
a cooking pack fastening portion having a first screw thread is provided in the cooking pack; and
a tube fastening portion having a second screw thread configured to be fastened to the cooking pack fastening portion provided in the tube, wherein the cooking pack and the tube communicate with each other via the cooking pack fastening portion and the tube fastening portion.

5. The cooking appliance of claim 4, wherein the tube fastening portion is provided at a free end of the first tube.

6. The cooking appliance of claim 1, wherein the exhaust duct and the air pump are arranged in a same lateral surface of the cabinet.

7. The cooking appliance of claim 1, wherein sealing is performed between the one wall of the cabinet and the connector and between the connector and the tube penetrating the connector.

8. The cooking appliance of claim 1, wherein a material used in forming an extended area of the first tube into the cooking chamber is different from a material used in forming an extended area outside the cooking chamber with respect to the connector.

9. The cooking appliance of claim 8, wherein the extended area of the first tube into the cooking chamber with respect to the connector is formed of a higher heat-resistant material than the extended area outside the cooking chamber with respect to the connector.

10. The cooking appliance of claim 8, wherein the extended area of the first tube into the cooking chamber and the extended area outside the cooking chamber with respect to the connector are formed as independent tubes and connected with each other via the connector.

11. The cooking appliance of claim 8, wherein the extended area of the first tube into the cooking chamber and the extended area outside the cooking chamber with respect to the connector are integrally formed with each other as one tube.

12. The cooking appliance of claim 1, further comprising:
a temperature sensor configured to measure a temperature in the cooking chamber, wherein the control unit controls driving of the heating means based on a signal sensed by the temperature sensor so as to keep the temperature in the cooking chamber within a preset range during the cooking cycle.

13. The cooking appliance of claim 1, wherein the heating means is a steam generator and the control unit is configured to control a steam heater provided in the steam generator.

* * * * *